Patented Dec. 15, 1936

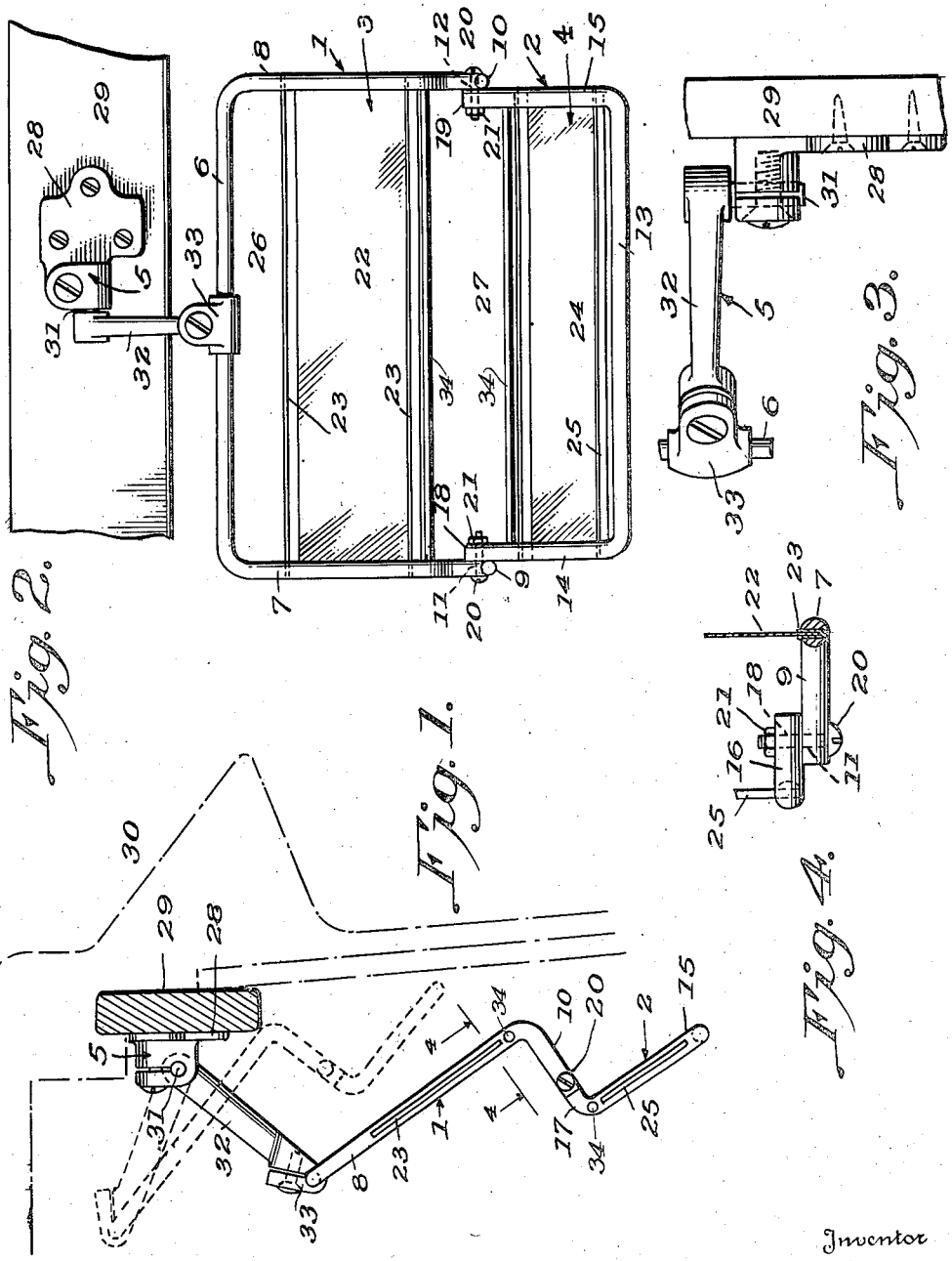

2,064,746

UNITED STATES PATENT OFFICE 2,064,746

GLARE SHIELD

Charles A. Hawk, Salem, Oreg.

Application March 23, 1936, Serial No. 70,476

5 Claims. (Cl. 296—97)

This invention relates to a glare shield designed primarily for use in connection with automotive vehicles, but it is to be understood that the shield, in accordance with this invention, is for use in any connection for which it may be found applicable, and the invention has for its object to provide, in a manner as hereinafter set forth, a shield of the class referred to, so constructed and arranged whereby the driver, at all times, has a full view of the road and can, by raising or lowering his eyes a small fraction, shut out all glaring light.

A further object of my invention is to provide, in a manner as hereinafter set forth, means to destroy the glare of the lights of an approaching vehicle when driving at night while preserving the visibility, as well as to destroy the glare of the sun rays while driving in daylight whereby an element of safety, when driving on roads during the day or night, is provided to greatly reduce the possibility of accidents.

A further object of the invention is to provide, in a manner as hereinafter set forth, a shield for the purpose referred to including a pair of spaced angularly adjustable shutters formed of a material for shutting out to a driver all glaring lights from a vehicle traveling towards the front of that vehicle operated by the driver.

Further objects of the invention are to provide, in a manner as hereinafter set forth, a shield for the purpose referred to which is simple in its construction and arrangement, strong, durable, compact, conveniently adjusted, thoroughly efficient in its use, readily installed in an automotive vehicle, quickly positioned in inactive position and held in such position when desired and inexpensive to manufacture.

With the foregoing and other objects which may hereinafter appear, the invention consists of the novel construction, combination and arrangement of parts as will be more specifically described and as are illustrated in the accompanying drawing wherein as shown an embodiment of the invention, but it is to be understood that changes, variations and modifications may be resorted to which fall within the scope of the invention as claimed.

In the drawing:

Figure 1 is a fragmentary view in vertical section in full and dotted lines, illustrating the front of an automobile body showing the adaptation therewith of a glare shield, in accordance with this invention, and with the shield illustrated in two different positions, one being in full lines and the other in dotted lines, Figure 2 is a front elevation of the shield in attached position to the automotive vehicle, Figure 3 is a top plan view of the adjustable suspension structure for the shield, and Figure 4 is a fragmentary view in top plan of the shield.

A glare shield, in accordance with this invention, includes an upper adjustable inverted U-shaped carrier 1, a lower adjustable U-shaped carrier 2 of less width and height than carrier 1, an upper glare arresting shutter 3, a lower glare arresting shutter 4 and an adjustable suspension structure 5.

The carrier 1 includes a top bar 6 and a pair of side bars 7, 8 of less length than that of bar 6 and formed with right angularly disposed rearwardly extending lower end terminal portions 9, 10 respectively, provided at their free ends with openings 11, 12 respectively aligning with each other.

The carrier 2 includes a bottom bar 13 and a pair of side bars 14, 15 of less length than that of bar 13 and formed with right angularly disposed forwardly extending upper end terminal portions 16, 17 respectively, provided at their free ends with openings 18, 19 respectively, aligning with each other.

The terminal portions 16, 17 of carrier 2 are arranged respectively against the inner sides of the end terminal portions 9, 10 of the carrier 1. The openings 11 and 12 register respectively with the openings 18, 19 when the end terminal portions 16, 17 are arranged between the end terminal portions 9, 10. Pivot screws 20 extend through the registering openings 11, 12, 18 and 19 and connect the carriers together and permit of angularly adjusting one carrier relative to the other. The pivots 20 abut the end terminal portions 9, 10 and extend inwardly from the end terminal portions 16, 17. The pivots 20 are provided with binding nuts 21 which coact with the end terminal portions 16, 17 for detachably maintaining the carriers in adjusted relation.

The upper shutter 3 is on the carrier 1. The shutter 3 is of rectangular contour and has its upper lengthwise edge spaced adjacent to the bar 6. The lower lengthwise edge of shutter 3 is spaced above the end terminal portions 9, 10. The shutter 3 is suitably secured at its ends to the bars 7, 8, and consists of a translucent rectangular panel 22, preferably green, having its top and bottom lengthwise edges provided with a binder or reinforcing means 23.

The lower shutter 4 is on the carrier 2. The shutter 4 is of rectangular contour and of less width than that of shutter 3. The upper lengthwise edge of shutter 4 is spaced below the upper end terminal portions 16, 17. The lower lengthwise edge of shutter 4 is spaced above the bottom bar 13. The shutter 4 is suitably secured at its ends to the bars 14, 15 and consists of a translucent rectangular panel 24, preferably green, having its top and bottom lengthwise edges provided with a binder or reinforcing means 25.

The angularly disposed end terminal portions of the carriers provide for offsetting the shutter 4 rearwardly with respect to shutter 3.

The space 26, between the shutter 3 and top bar 6, is for vision. The space 27, between the shutters 3, 4, is for vision. The shutters 3, 4 are for vision. The spaces 26, 27 are selectively used by the driver for vision when there appears no approaching light glares. The shutters 3, 4 are selectively used if there appears oncoming light glares and in this connection the driver merely moves his eyes to view through the lower or upper shutter.

The adjustable suspension structure 5 includes an adjustable clamp 28 which is fixed to that part 29 of the automotive body 30 which is arranged above the windshield, an adjustable pivot 31 for extension into the clamp 28 to be detachably secured thereto, a hanger bar 32 from the upper end of which extends, at right angles, the pivot 31. The lower end of the bar 32 is provided with an adjustable clamp 33 to which the top bar 6 of the carrier 1 is adjustably connected. The structure 5 is angularly adjustable relative to the part 29 of the body 30. The structure 5 provides means for suspending the carriers and shutters above the driver. The clamp 33 allows for the angularly adjusting of the carrier 1 relative to bar 1 and part 5.

Owing to the adjustability of the carriers, the shutters and spaces 26, 27 may be positioned at any suitable point desired by the driver. The shield, when in active position, is disposed between the driver and the windshield.

Each of the carriers includes a reinforcing rod 34 anchored at its ends to the sides thereof. Each rod 34 is disposed at one of the lengthwise edges of a translucent panel. The rods will make the carriers stronger allowing the translucent panels to be drawn tighter. This also has a way of tending to make the open space between the two colored panels more pronounced and adding to the efficiency of the device. The rods can be either spot welded to the carriers or riveted.

What I claim is:

1. A glare shield comprising an upper and a lower rectangular carrier, a glare arresting shutter arranged within, secured to the sides of and spaced from the bottom and the top of each carrier, and means connected to the carriers to provide for adjusting them in angular relation, said carriers having oppositely extending angularly disposed coacting end terminal portions connected together by said means for disposing the shutter secured to the upper carrier forwardly offset with respect to the shutter secured to the lower carrier, said shutters being arranged relative to each other and to said carriers to provide upper and lower clear vision spaces.

2. A glare shield comprising an upper and a lower skeleton carrier, a glare arresting shutter arranged within, secured to the sides of and spaced from the top and bottom of each carrier, means connected to the carriers to provide for adjusting them in angular relation, said carriers having oppositely extending angularly disposed coacting end terminal portions connected together by said coacting means for disposing the shutter secured to the upper carrier forwardly offset with respect to the shutter secured to the lower carrier, and an angularly adjustable suspension structure for said carriers directly connected to and overlapping the top of the upper carrier, said structure having means to provide for the angular adjusting of the upper carrier relative thereto.

3. A glare shield comprising an upper and a lower carrier, a glare arresting shutter secured to each carrier, means connected to the carriers to provide for adjusting them in angular relation, said carriers extending into each other and having coacting means for disposing the shutter secured to the upper carrier forwardly offset with respect to the shutter secured to the lower carrier, said shutters being arranged relative to each other and to said carriers to provide upper and lower clear vision spaces, and an angularly adjustable suspension structure for said carriers connected to the top of the upper carrier, said structure having means to provide for the angular adjusting of the upper carrier relative thereto.

4. In a glare shield for the purpose set forth, an angularly adjustable suspension having a laterally disposed pivot at one end, an adjustable clamp encompassing the pivot for connecting said end of the suspension to a support, upper and lower rectangular carriers, each provided with a glare shutter spaced from its top and bottom and secured to its sides, said suspension being provided with means at its other end for adjustably connecting the top of the upper carrier therewith, said upper carrier having rearwardly directed angularly disposed lower end terminal portions, said lower carrier having forwardly directed angularly disposed upper end terminal portions, said upper and lower terminal portions coacting for maintaining the shutter secured to the upper carrier forwardly of said other shutter, and means connected to said upper and lower end terminal portions to provide for adjusting the carriers in angular relation.

5. In a glare shield for the purpose set forth, an angularly adjustable suspension having a laterally disposed pivot at one end, an adjustable clamp encompassing the pivot for connecting said end of the suspension to a support, upper and lower rectangular carriers, each provided with a glare shutter spaced from its top and bottom and secured to its sides, said suspension being provided with means at its other end for adjustably connecting the top of the upper carrier therewith, said upper carrier having rearwardly directed angularly disposed lower end terminal portions, said lower carrier having forwardly directed angularly disposed upper end terminal portions, said upper and lower terminal portions coacting for maintaining the shutter secured to the upper carrier forwardly of said other shutter, means connected to said upper and lower end terminal portions to provide for adjusting the carriers in angular relation, and said shutters being arranged relatively to each other and to the carriers to provide a clear vision space at the top of the upper carrier and a clear vision space between said shutters.

CHARLES A. HAWK.